United States Patent [19]
Jehan et al.

[11] Patent Number: 5,400,116
[45] Date of Patent: Mar. 21, 1995

[54] APPARATUS AND METHOD FOR PRODUCING GRADATED EXPOSURES ON RADIATION SENSITIVE MATERIAL

[75] Inventors: Howard P. Jehan, Honeoye Falls; Gary A. Granath, Fairport; Mark R. O'Donnell, Webster; James E. Bird, Rush, all of N.Y.

[73] Assignee: Eastman Kodak Company, Rochester, N.Y.

[21] Appl. No.: 147,230

[22] Filed: Nov. 3, 1993

[51] Int. Cl.[6] .............................................. G03B 27/72
[52] U.S. Cl. ........................................ 355/53; 355/71; 354/20
[58] Field of Search ........................ 355/53, 71; 354/20

[56] References Cited

U.S. PATENT DOCUMENTS

| | | | |
|---|---|---|---|
| 3,942,184 | 3/1976 | Blinow et al. | 354/42 |
| 4,131,349 | 12/1978 | Tobias | 354/20 |
| 4,663,522 | 5/1987 | Welbourn et al. | 250/223 |
| 4,730,213 | 3/1988 | Kelly, 3rd et al. | 358/107 |
| 4,810,872 | 3/1989 | Murakoshi et al. | 350/225 |
| 4,896,187 | 1/1990 | Clapp | 355/71 |
| 4,932,779 | 6/1990 | Keane | 356/319 |
| 4,970,546 | 11/1990 | Suzuki | 355/53 |
| 5,075,716 | 12/1991 | Jehan et al. | 355/1 |

*Primary Examiner*—Michael L. Gellner
*Assistant Examiner*—Daniel Patrick Malley
*Attorney, Agent, or Firm*—Charles E. Snee, III

[57] ABSTRACT

A method and apparatus (10) referred to as a step and repeat sensitometer directs radiant energy (18) from a radiant energy source (16) into a diffuse integrating chamber (2) which uniformly mixes and directs the radiant energy (18) onto an exposure plane (14) where a radiation sensitive sample (1) is positioned so that individual areas of the sample (1) are exposed to readily adjustable levels of illuminance producing gradated exposures.

39 Claims, 4 Drawing Sheets

APPARATUS AND METHOD FOR PRODUCING GRADATED EXPOSURES ON RADIATION SENSITIVE MATERIAL

FIELD OF THE INVENTION

The present invention concerns methods and apparatus for producing gradated exposures on radiation sensitive material. More particularly, the invention concerns sensitometric methods and apparatus in which photosensitive papers or films are exposed in separate areas to increasing or decreasing levels of illuminance. Then, the exposed papers or films are processed and analyzed to determine the density of the image produced by the exposure in each area, the density series being a measure of the sensitometric response of the papers or films.

BACKGROUND OF THE INVENTION

Apparatus known as sensitometers have been used for many years to expose samples of photographic papers and films in a very precise manner for subsequent densitometric analysis in which the density of the image produced by such exposure is measured. Such apparatus and the associated methods must be capable of exposing the photosensitive sample with a high degree of precision, accuracy and repeatability. More particularly, excellent control must be achieved for factors such as the illuminance at the exposure plane or the amount of radiant energy per unit area on the sample at a given point in time, the exposure time or the period during which the sample is exposed to radiant energy, the color of such illuminance, the color temperature or spectral distribution of the radiant energy reaching the sample and the uniformity of the exposure across the surface of the sample. In the testing of photographic films and papers, a further concern is to be able to test the sample at illuminances, exposure times and color temperatures which closely approximate those to which end users subject the actual products. For testing purposes incident to manufacture of such films and papers, these three aspects of the exposure must be controlled more precisely than ever would be required by the end user. To maintain high productivity, some end users want to expose the product at faster and faster shutter times. To test a sample at such exposure times, the illuminance at the exposure plane must be increased in inverse proportion to the exposure time if the sample is to receive the same total amount of radiant energy as at a slower shutter speed. The flexibility to meet such changing test requirements has been largely absent from known sensitometric systems in which radiant energy requirements are high.

In known sensitometers, the radiant energy source typically is located far enough away from the sample that the sample is essentially uniformly illuminated and still receives enough radiant energy for proper exposure. Exposure times are created by a variety of shutter mechanisms, located either very close to the light source or very close to the sample. The radiant energy reaching the sample is attenuated through a test object or wedge or step tablet located between the source and the sample, with the sample usually pressed flat against the test object. Such test objects are made from a material transparent to the radiant energy to which have been added graded amounts of some spectrally neutral attenuating material, such as carbon or Inconel in the case of visible light, often in twenty-one individual steps measuring about 10 mm by 10 mm (0.39 by 0.39 in) and sandwiched between two pieces of color-clear glass. Thus, radiant energy transmitted through the test object is attenuated by the added material before striking the sample. Often, the exposed and processed sample has an exposed area measuring about 210 mm by 10 mm (8.27 by 0.39 in) which is made up of twenty-one contiguous steps, each step in the test object being made to attenuate radiant energy in a different proportion than either adjacent step. Such test objects typically attenuate visible light by 0.10 log, 0.15 log or 0.20 log increments to form what are called 0-2, 0-3 and 0-4 gradient test objects, respectively.

While such sensitometer apparatus and methods have long been used with acceptably good results, a variety of problems have been identified. Sensitometers that position the light source close to the exposure plane can significantly increase the energy incident on the exposure plane, but doing so can cause the distribution of energy at the exposure plane to be highly non-uniform. Those sensitometers that position the light source far from the exposure area in an attempt to uniformly illuminate the exposure plane typically deliver low exposure energy. Also, while distancing the light source from the exposure plane improves illumination uniformity, the uniformity can still be adversely affected by the non-uniform spatial emission characteristics of the light source itself. Since the spatial emission for each individual light source is often different, it can be very difficult to maintain exposure plane uniformity over a long period of time. Because of the way test objects are made, it is difficult to set with precision the degree of attenuation in each step and it is difficult to change the attenuation in any step once the object has been made. For the same reason, it is difficult to make any two objects just alike. Also, because these test objects are used during an exposure when physically touching the sensitized material, any dust resting on the test object, optical phenomena (e.g. Newton rings) or physical imperfections in the materials making up the test object are imaged directly onto the sensitized material, causing an undesirable non-uniform image. Also, nonuniformities in any optical element placed in the optical path during an exposure can produce a non-uniform as well as spectrally degraded image. Also, the use of a test object in contact with the sample during an exposure can make it difficult to measure the amount of energy illuminating the sample while the exposure is taking place.

One prior art sensitometer known to the present inventors includes a light source positioned only inches from an exposure plane containing a twenty-one step contiguous step test object and is designed to illuminate only a 10 mm step exposure format.

Another prior art sensitometer places a twenty-one step contiguous step test object at one end of an integrating chamber which is sized large enough to uniformly illuminate all of this test object with one exposure.

SUMMARY OF THE INVENTION

An object of the present invention is to provide an apparatus and method for exposing photographic material in which dust resting on the test object, physical imperfections in the materials making up the test object, and non-uniformities in any element placed in the optical path during an exposure are not imaged onto the photographic material.

Another object of the present invention is to provide such an apparatus and method which is capable of delivering in excess of 50,000 lux at the exposure plane.

Still another object of the present invention is to provide such an apparatus and method that can uniformly illuminate different size areas of the photographic material.

A further object of the present invention is to provide such an apparatus and method in which the same test object can be used to illuminate different size areas of a photographic material.

Yet a further object of the present invention is to provide such an apparatus and method that will afford the ability to change the effective attenuation range of the test object without having to physically remove test objects.

Still another object of the present invention is to provide such an apparatus and method that will allow measurement of the light illuminating the sample during an exposure without affecting the quality of the exposure.

To accomplish these and other objects, there is provided, in one aspect of the invention, an apparatus for producing gradated exposures on a sample of radiation sensitive material comprising means for supporting a sample of radiation sensitive material on an exposure plane and a source of radiant energy for delivering radiant energy along a path. An integrating chamber is provided for uniformly distributing the radiant energy at the exposure plane. The integrating chamber of the invention includes a radiant energy entrance port and an exit port for receiving and then passing the radiant energy therethrough. Means are provided for attenuating the radiant energy entering the integrating chamber. Gradated exposures are produced when the radiation sensitive material is moved over the exposure plane and repeatedly subjected to different but precisely known exposures of the attenuated radiant energy.

In another aspect of the invention, an apparatus for producing gradated exposures on a sample of radiation sensitive material uses an attenuating means comprising a plurality of neutral attenuating filters, one of each for producing a different gradated exposure.

Moreover, in yet another aspect of the invention, a method for producing gradated exposures on a sample of radiation sensitive web comprises the steps of providing the apparatus described above, exposing the sample of radiation sensitive web to sequentially changed attenuated radiant energy and, then repeatedly and precisely positioning the sample as it moves within the exposure plane so as to continually produce gradated exposures.

Accordingly, important advantages of the present apparatus and method for producing gradated exposures on radiation sensitive material are that it provides high intensity, short duration, highly uniform sensitometric exposures and, it is relatively inexpensive to manufacture.

BRIEF DESCRIPTION OF THE DRAWINGS

The foregoing as well as other objects, features and advantages of this invention will become more apparent from the appended FIGURES, wherein like reference numerals denote like elements, and wherein.

DETAILED DESCRIPTION OF THE INVENTION

Figure 1:
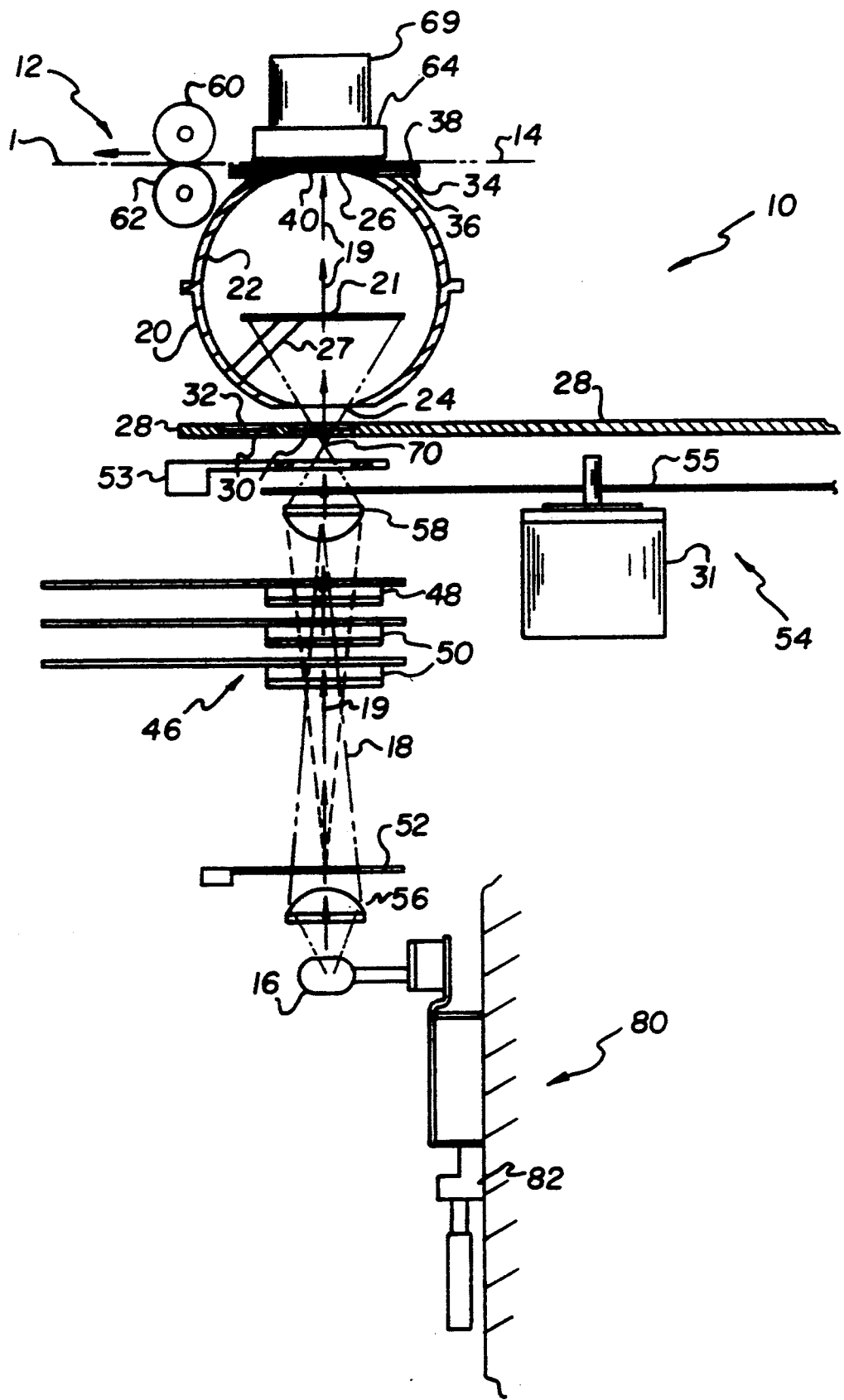
FIG. 1 shows a front elevation view, partially sectioned, of the apparatus according to the invention.
Figure 2:
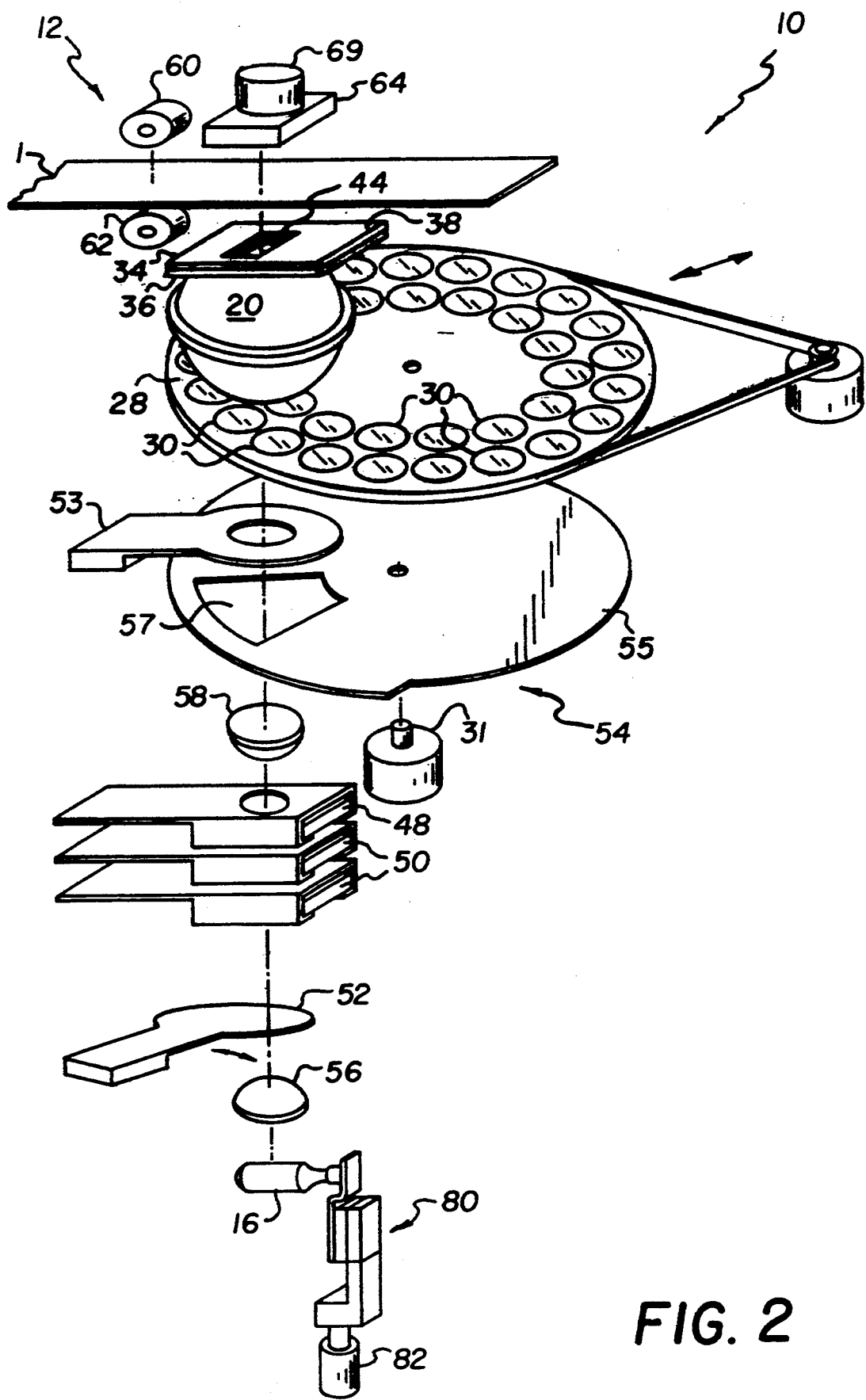
FIG. 2 is an exploded isometric view of the apparatus of the invention.

Turning now to the drawings, and in particular to FIGS. 1 and 2, the apparatus 10 of the invention for producing gradated exposures on radiation sensitive material 1 is illustrated. Broadly defined, apparatus 10, also referred to as a step and repeat sensitometer, comprises means 12 for supporting a sample 1 of radiation sensitive material on an exposure plane 14, a source 16 of radiant energy for producing a beam 18 of radiant energy along an optical path 19, an integrating chamber 20 having an interior wall 22 for uniformly distributing the radiant energy at the exposure plane 14, and an attenuating means 28 for attenuating the radiant energy 18 entering the integrating chamber 20, each feature being described in greater detail hereinafter. Accordingly, in this embodiment of the invention, when the sample 1 of radiation sensitive material is moved along the exposure plane 14, it is repeatedly subjected to different but precisely known exposures of attenuated radiant energy thereby producing gradated exposures.

Figure 3:
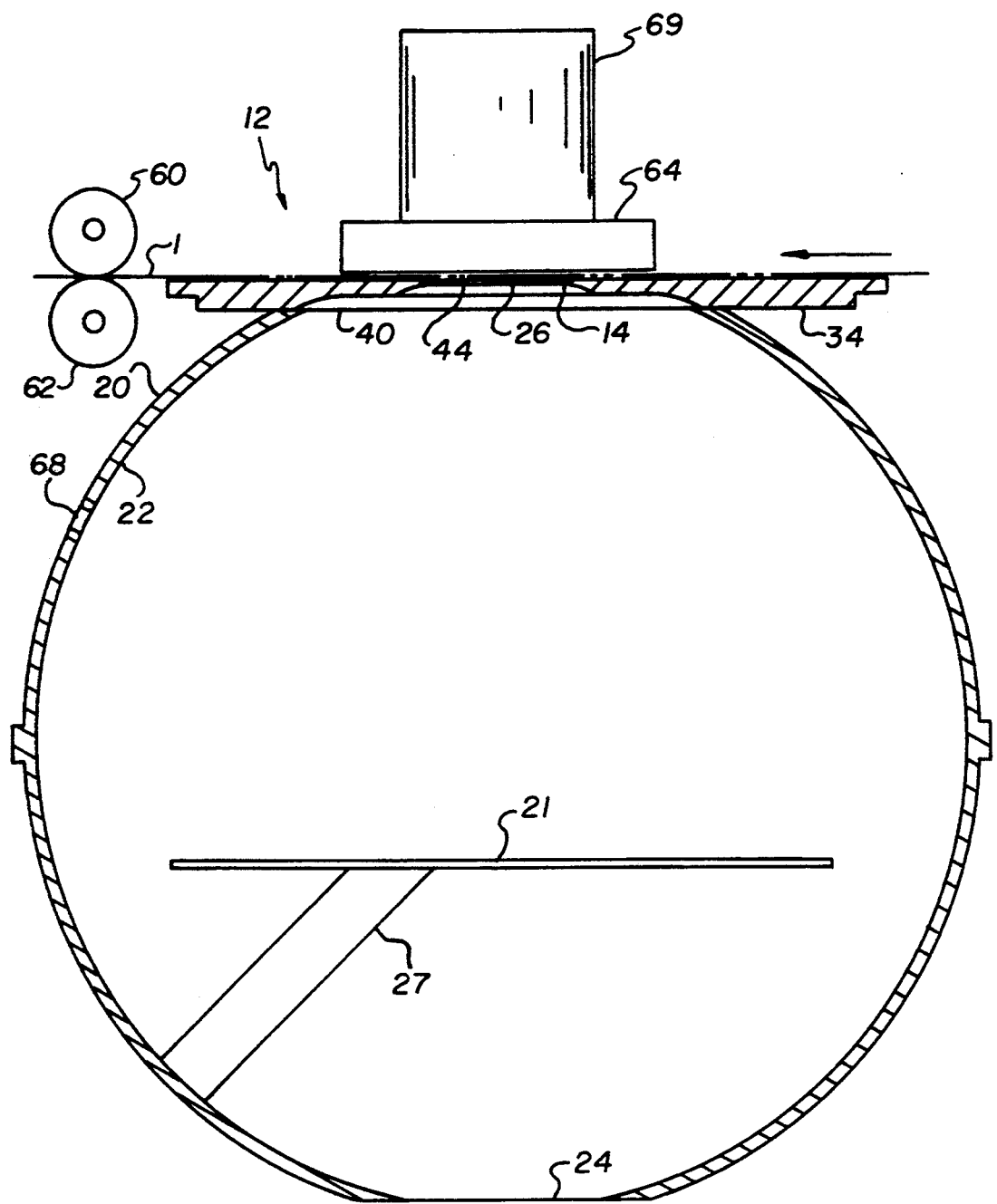
FIG. 3 shows an enlarged elevation view, partially sectioned to show the interior, of the integrating chamber of the invention.
Figure 4:
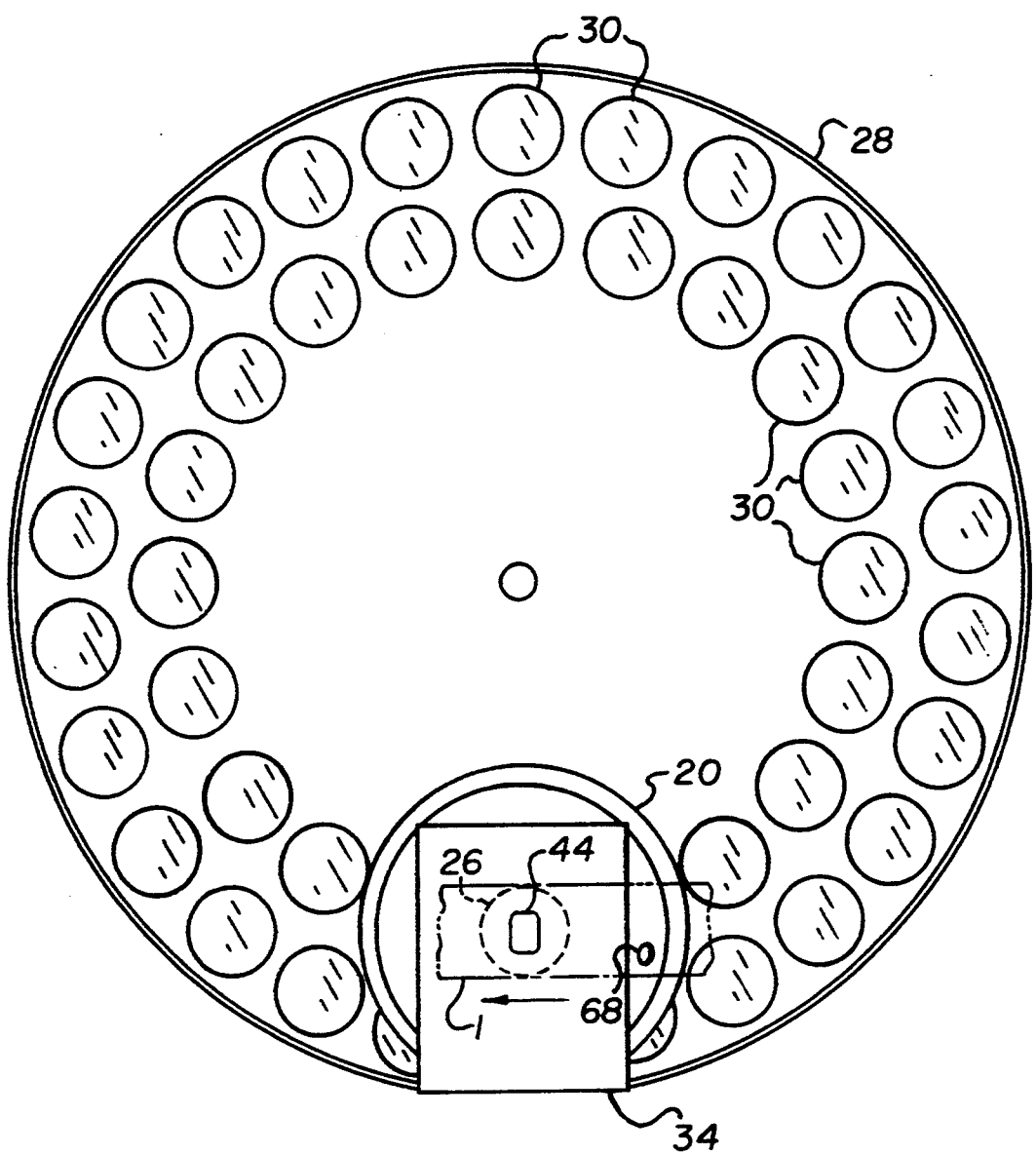
FIG. 4 shows a top plan view of the test object filter wheel of the invention.

In FIGS. 1, 2 and 3, the integrating chamber 20 is constructed in a spherical shape, and comprises an entrance port 24 allowing beam 18 of light to enter the integrating chamber 20, a baffle 21, supported by wall support member 27, designed to deflect light entering the chamber 20 onto the interior wall 22, and an exit port 26 located at an opposite end of the chamber 20 relative to the entrance port 24. This integrating chamber 20 arrangement ensures that no radiant energy 18 entering the integrating chamber 20 can reach the exposure plane 14 without reflecting off the interior wall 22. Moreover, the above described integrating chamber 20 ensures that radiant energy reaching the radiation sensitive sample 1 is mixed uniformly. This property eliminates the chance that filter non-uniformities and imperfections might be imaged onto the photographic sample 1. Further, interior walls 22 of the chamber 20 are coated, preferably with Spectroflect ® available from Labsphere, Inc. of North Sutton, N.H., so as to reflect the radiant energy 18 in a diffuse and spectrally neutral manner. While other integrating chamber 20 geometries may prove equally as efficient for mixing the deflected radiant energy, a spherical shaped chamber manufactured by Labsphere, Inc. is preferred by the inventors.

Turning again to FIG. 1, the apparatus 10 of the invention is well suited for precisely exposing radiation sensitive webs such as photographic films and papers. In the preferred embodiment of the invention, beam 18 is focused into the diffuse integrating chamber 20 using first and second condenser lenses 56,58. First and second condenser lenses 56,58 serve several purposes. First, they make efficient use of the beam 18 provided by the source 16 of radiant energy or lamp by directing greater amounts of beam 18 into the integrating chamber 20 than would normally occur. Although an incandescent lamp having an output power of 250 watts is the preferred source 16 of radiant energy, those skilled in the art will appreciate that other sources of radiant energy could be used such as mercury vapor, halogen, electronic flash lamps, and lasers.

In addition, by locating a shutter system 54 (described hereafter) near the focal plane 70 (FIG. 1) formed on the optical path 19 by the beam 18 passing through the first and second lenses 56,58, faster exposure times are assured and the efficiency of the shutter system 54 is greatly increased. In this embodiment of the invention, shutter system 54 comprises a blade-type shutter 53, preferably one made by Uniblitz Corp. of Rochester, N.Y. and, a rotating shutter member 55 or sector shutter having an aperture 57 for sequentially opening and closing the optical path 19 of the radiant energy thereby allowing beam 18 to pass through opened blade-type shutter 53. Blade-type shutter 53 is used for preventing multiple exposures and for providing exposures for longer exposure times, when required. Rotating shutter member 55 is preferably driven by motor 31, although other means of sequentially activating shutter member 55 may be used such as air pressure.

Further, adjusting the position of the source 16 of radiant energy relative to the first condenser lens 56 using adjustment member 80 (shown clearly in FIGS. 1 and 2) affords a highly efficient way of adjusting and maintaining energy at the exposure plane 14. A micrometer type adjustment device 82 is preferred by the inventors. The space between the first and second lenses 56,58, moreover, provides room to allow various optical filtering elements to be placed in the optical path 19, which can be used to alter the spectral composition of the beam 18 entering the integrating chamber 20 to illuminate the photographic sample 1, as further described below.

Furthermore, according to FIGS. 1, 2 and 3, the exposure plane 14 is located at the exit port 26 of the integrating chamber 20. Exposure plane 14 is formed at one surface of an aperture plate 34, movable parallel to the sample 1, containing an aperture 44 through which beam 18 of light travels to expose the photographic sample 1. The size of this aperture 44 determines the area of the sample 1 to receive the exposure. Thus, the aperture 44 is sized so that beam 18 passing therethrough exposes a specific portion of the radiation sensitive material 1. By replacing this aperture plate 34 with another containing a different size aperture 44, the amount of sample 1 receiving the exposure will be altered. Moreover, aperture plate 34 positioned between the exit port 26 of the integrating chamber 20 and the sample 1 of radiation sensitive material (shown in FIGS. 1–3), includes a first side 36 positioned to face the integrating chamber 20 and, a second side 38 positioned to face the sample 1 of radiation sensitive material. The first side 36 is coated with a diffuse, neutral coating, such as Spectraflect ® available from Labsphere, Inc.. As best seen in FIG. 3, the aperture plate 34 is configured to conform with the truncated portion 40 of the integrating chamber 20 so as to preserve the sphericity of the chamber 20 and thereby achieve maximum attenuated energy and preserve the diffuse nature of the light 18 exiting the integrating chamber 20.

In many sensitometers or apparatus 10 for producing gradated exposures on radiation sensitive material 1, as discussed above, attenuating means 28 including filters 30 comprising the test object are located at the exposure plane 14, rigidly affixed between two pieces of glass in a predetermined order which, once assembled, are difficult to alter. However, in the preferred embodiment of this invention, these filters 30 are instead individually held in a device designed to position any one filter 30 in the path 19 of the light entering the integrating chamber 20 during an exposure. The device holding these filters 30 may take many forms. In the preferred embodiment of this invention, the attenuating means 28 is made in the shape of a wheel or disk-like structure which is made to hold two rows of twenty and twenty-six filters 30 respectively along its outer circumference. By turning this wheel about its vertical axes, and by moving the wheel in the plane (denoted by arrow) via air cylinders (not shown) formed by the wheel itself, any of these forty-six filters 30 can be placed in the optical path 19 during an exposure. This number of filters 30 is sufficient to produce three commonly used exposure gradients: 0-2, 0-3, 0-4. In addition, since filters 30 can be placed in the optical path 19 in any sequence, non-standard exposure gradients can be easily produced. To produce these sensitometric exposure gradients, the filters may be fabricated out of any suitable neutral attenuating material. The preferred material is cast carbon, but Inconel deposited on glass substrate or other materials could also be used.

FIGS. 1-3 show the apparatus 10 of the invention comprising means 12 of movably supporting or positioning a sample 1 of photographic web at the exposure plane 14. As shown clearly in FIG. 3, supporting means 12 comprises a pair of drive rollers 60,62 driven by motor (not shown), a guide edge (not shown) used to direct the path of the sample 1 and, a backing plate 64 mounted for adjustment to solenoid 69 which serves to assure the planarity of the sample 1 in the exposure plane 14 during an exposure. By placing a portion of the sample 1 between the drive rollers 60,62, the position of the sample 1 may be controlled relative to the exposure aperture 44 in the direction parallel to the axes of rotation of the drive rollers 60,62. In addition, the position of the supporting means 12, in particular the guide edge (not shown), may be made adjustable along the axes of rotation of the drive rollers 60,62, in the exposure plane 14, allowing exposures to be made on different portions of the sample 1. Backing plate 64 and solenoid 69 of supporting means 12 are designed to be removable to allow light measurement devices access to the exposure plane 14 so that the spectral quality and intensity of the light at the exposure plane 14 can be monitored.

In operation of the apparatus 10, the operator first inserts the required combination of color correcting and neutral attenuating filters 48,50 into the optical exposure path 19, installs the required exposure aperture 44 at the exposure plane 14, and through a control device (not shown) selects the combination of neutral attenuating filters 50 needed to produce the required gradated sensitometric exposures. A sample 1 of the radiation sensitive material is then loaded into the supporting means 12, described above, which supportably moves the sample 1 in the exposure plane 14. The control device is then signaled to begin an automated exposure sequence. The exposure sequence comprises first moving a filter protecting means 52 out of the optical path 19 allowing radiant energy to pass through the manually inserted filters 48,50 and onto a closed exposing shutter system 54. Gradated exposures produced during this sequence are achieved by spinning the rotating shutter member 55 (described above) at the speed necessary to produce the required exposure times. In this instance, a slower operating blade-type shutter 53 (described above) is used to prevent multiple exposures from occurring. If the required exposure time is sufficiently long for the blade-type shutter 53 to operate, blade-type shutter 53 may produce the exposure times with the rotating shutter member 55 fixed so as to pass radiant energy therethrough. The sample 1 is then automatically positioned so that the required portion of the sample 1 may receive the exposure and pressed flat against the exposure plane aperture plate 34 once the sample 1 is in position. At the same time the neutral attenuating filter 50 used to produce attenuation needed for this particular gradated exposure is automatically moved into the optical path 19. When both the sample 1 and the filter 50 are properly positioned, the shutter system 54 is caused to make the required exposure. At this point the exposure intensity and duration may be determined through sensors (not shown) situated to receive radiant energy from the monitoring port 68 (FIG. 3) of the integrating chamber 20. When the exposure is complete the cycle of sample positioning, gradated filter positioning, and exposing is repeated until the desired number of gradated exposures has been made. The sample 1 is then either repositioned to begin the exposure sequence anew or caused to move away from the exposure area so that a new sample 1 may be exposed.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes for exemplification, but is to be limited only by the scope of the attached claim or claims, including the full range of equivalency to which each element thereof is entitled.

We claim:

1. Apparatus for producing gradated exposures on radiation sensitive material, the apparatus comprising:
   a) means for movably supporting a sample of radiation sensitive material on an exposure plane so as to precisely position said radiation sensitive material to receive gradated exposures;
   b) a source of radiant energy for producing a beam of radiant energy along a path;
   c) a spherically-shaped integrating chamber for uniformly distributing the radiant energy at the exposure plane, said integrating chamber comprising an interior wall, a radiant energy entrance port and an exit port for receiving and then passing said radiant energy therethrough;
   d) means for attenuating said radiant energy entering said integrating chamber thereby defining attenuated radiant energy;
   whereby said sample of radiation sensitive material when moved in said exposure plane is repeatedly subjected to different but precisely known exposures of said attenuated radiant energy thereby producing first and second gradated exposures arranged in a predetermined pattern.

2. The apparatus recited in claim 1 wherein said source of radiant energy is an incandescent lamp.

3. The apparatus recited in claim 1 wherein said interior wall being adapted to reflect said radiant energy in both a diffuse and spectrally neutral manner.

4. The apparatus recited in claim 1 wherein said means for attenuating comprises a substantially disk-like member having a plurality of apertures, each one of said apertures being alignable with said path of said radiant energy for selectively passing radiant energy therethrough to said sample of radiation sensitive material.

5. The apparatus recited in claim 4 wherein said apertures are configured to accommodate filters for producing 0-2, 0-3, and 0-4 gradated exposures.

6. The apparatus recited in claim 1 further comprising an aperture plate positioned between said exit port of said integrating chamber and said sample of radiation sensitive material, said aperture plate having a first and second side, said first side being positioned to face said integrating chamber and, said second side being positioned to face said sample of radiation sensitive material thereby defining said exposure plane.

7. The apparatus recited in claim 6 wherein said first side is configured to conform with a truncated portion of said integrating chamber.

8. The apparatus recited in claim 6 wherein said first side is provided with a diffuse, spectrally neutral coating.

9. The apparatus recited in claim 6 wherein said aperture plate comprises an aperture sized so that said radiant energy passing therethrough exposes a specific portion of the radiation sensitive material.

10. The apparatus recited in claim 6 wherein said aperture plate is movable parallel to the radiation sensitive material.

11. The apparatus recited in claim 1 wherein a filter system is provided between the source of radiant energy and the entrance port of the integrating chamber.

12. The apparatus recited in claim 11 wherein said filter system comprises a color correcting filter, a neutral filter or a combination thereof.

13. The apparatus recited in claim 11 wherein means for protecting said filter system from radiant energy in the absence of exposures are provided between the source of radiant energy and the filter positioning means.

14. The apparatus recited in claim 11 wherein shutter means is provided between said integrating chamber and said filter system for sequentially exposing said exposure plane.

15. The apparatus recited in claim 11 wherein spatially separated first and second lens are provided for focusing the radiant energy into said entrance port of said integrating chamber.

16. The apparatus recited in claim 15 wherein said first and second lens are condensing.

17. The apparatus recited in claim 15 wherein said first lens is provided between said source of radiant energy and said filter system.

18. The apparatus recited in claim 15 wherein said second lens is provided between said filter system and said shutter means.

19. The apparatus recited in claim 4 wherein said source of radiant energy is an incandescent lamp.

20. The apparatus recited in claim 4 wherein said attenuating means comprises a substantially disk-like member having a plurality of apertures, one of said apertures being alignable with said path of said radiant energy for selectively passing radiant energy therethrough to said sample of radiation sensitive material.

21. The apparatus recited in claim 4 further comprising an aperture plate positioned between said exit port of said integrating chamber and said sample of radiation sensitive material, said aperture plate having a first and second side, said first side being positioned to face said integrating chamber and, said second side being positioned to face said sample of radiation sensitive material thereby defining said exposure plane.

22. The apparatus recited in claim 20 wherein said apertures are configured to accommodate filters for producing 0-2, 0-3, and 0-4 gradated exposures.

23. The apparatus recited in claim 21 wherein said first side is configured to conform with a truncated portion of said integrating chamber.

24. The apparatus recited in claim 21 wherein said first side is provided with a diffuse, spectrally neutral coating.

25. The apparatus recited in claim 21 wherein said aperture plate comprises an aperture sized so that said radiant energy passing therethrough exposes a portion of the radiation sensitive material.

26. The apparatus recited in claim 21 wherein said aperture plate is movable parallel to the radiation sensitive material.

27. The apparatus recited in claim 1 wherein a filter system is provided between the source of radiant energy and the entrance port of the integrating chamber.

28. The apparatus recited in claim 27 wherein shutter means is provided between said source of radiant energy and said filter system for sequentially exposing said exposure plane.

29. The apparatus recited in claim 28 wherein means for positioning at least one filter is provided between said shutter means and said filter system.

30. The apparatus recited in claim 29 wherein means for protecting the filters from radiant energy in the absence of exposures are provided between the source of radiant energy and the means for positioning.

31. The apparatus recited in claim 4 wherein spatially separated first and second lens are provided for focusing the radiant energy into the entrance port of said sphere.

32. The apparatus recited in claim 31 wherein said first and second lens are condensing.

33. The apparatus recited in claim 32 wherein said first lens is provided between said source of radiant energy and said color correcting filters.

34. The apparatus recited in claim 32 wherein said second lens is provided between said color correcting filters and said shutter means.

35. Method for producing gradated exposures on a radiation sensitive web, comprising the steps of:
 (a) positioning a sample of such web at an exposure plane;
 (b) providing a source of radiant energy;
 (c) providing an integrating sphere for shaping the path of the radiant energy delivered to said exposure plane, said integrating sphere having a entrance port and an exit port for receiving and then passing said radiant energy therethrough; and
 (d) exposing such sample of radiation sensitive web producing a first gradated exposure; and,
 (e) precisely repositioning said sample in said exposure plane and then exposing said sample producing a second gradated exposure.

36. The method recited in claim 35 further comprising the step of repeatedly repositioning and then exposing said sample of radiation sensitive material so as to continually produce gradated exposures after step (e).

37. The method recited in claim 35 wherein said source of radiant energy comprises an incandescent lamp.

38. The method recited in claim 35 further comprising the step of color correcting said radiant energy before the step of exposing.

39. The method recited in claim 35 wherein said step of precisely positioning comprises moving the sample in said exposure plane parallel to an aperture plate positioned between said exit port of said integrating chamber and said sample.

* * * * *